Patented Feb. 24, 1942

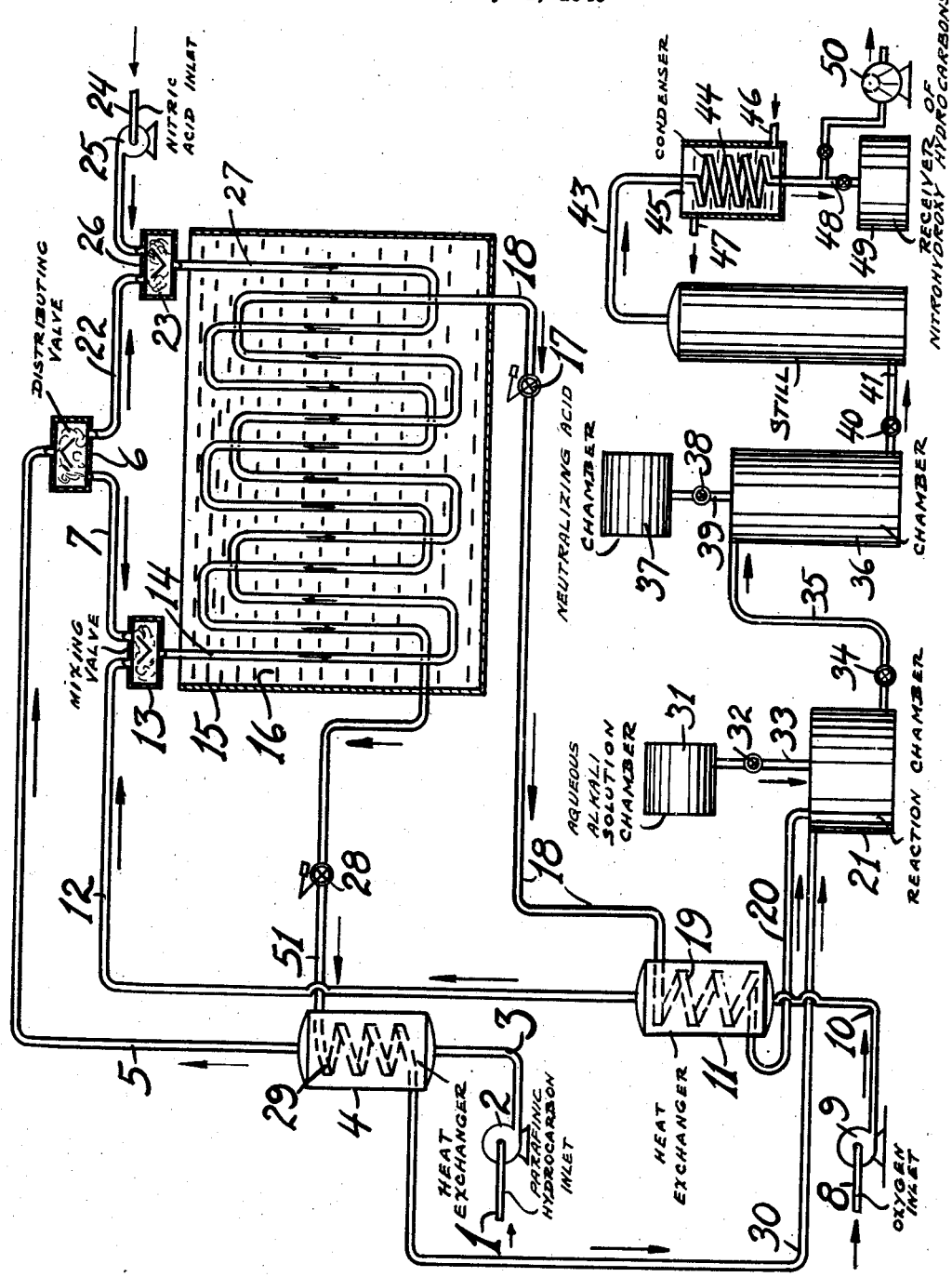

2,274,630

UNITED STATES PATENT OFFICE 2,274,630

PROCESS OF PREPARING NITROHYDROXY-HYDROCARBONS FROM HYDROCARBONS

Carleton Ellis, Montclair, N. J., assignor to Standard Oil Development Company, a corporation of Delaware Application May 11, 1940, Serial No. 334,643

2 Claims. (Cl. 260—635)

This invention relates to a method of securing nitrohydroxyhydrocarbons from hydrocarbon raw materials. Further, it relates to a method of securing nitrohydroxyhydrocarbons by a joint aldehydation-nitration of hydrocarbon raw material, followed by combining the products of the aldehydation-nitration operation. Still further, this invention relates to the controlling of aldehydation and nitration reactions by making these reactions mutually interdependent. Further objects will be apparent from the following disclosure of my invention.

It has been known that hydrocarbons, particularly those of aliphatic nature, can be oxidized to furnish oxidation products such as aldehydes, ketones, acids, oxyacids and the like. However, one of the chief difficulties which has been associated with such reactions has been that of controlling the reaction to produce a desired product. The reason for this is that the oxidation reaction, once begun, is exothermic in nature, and the heat developed by the reaction causes oxidation to proceed so rapidly that often the product of the reaction consists for the most part of coke, tar, and gases such as carbon monoxide and carbon dioxide. Various methods have been proposed to assist in controlling such reactions, as for example, by employing an inert diluent in the reaction mixture, or by quenching the reaction by suddenly reducing the temperature of the mixture of hydrocarbon, oxidizing agent and diluent. However, these methods are often difficult to put into operation, and very often result in a poor yield of oxidized material of the desired type. I have found a method of controlling oxidation of hydrocarbons, so that the desired product may be secured in good yield and the control of the process simplified.

Treat of hydrocarbons, particularly aliphatic hydrocarbons, with nitric acid or other nitrating agent at elevated temperatures results in the formation of nitrohydrocarbons. This reaction is endothermic in character, that is, it requires the continuous application of heat to make the reaction occur to any extent. I have found that when a process in which treatment of hydrocarbons with nitric acid or other nitrating agent is conducted in the same reaction zone and is contiguous with a process in which hydrocarbons are treated with an oxygen-containing gas the two processes become mutually interdependent. That is, the endothermic nitration reaction serves to control the exothermic aldehydation or oxidation reaction. Further, the exothermic oxidation reaction causes the nitration reaction to occur, by furnishing the heat required by the nitration reaction.

The products from the controlled, joint aldehydation-nitration step are further interacted, according to my invention, to furnish nitrohydroxyhydrocarbons. Thus, I am able to effect the production of nitrohydroxyhydrocarbons from a single raw material in a simple, one-stage, controlled process.

The accompanying drawing is a diagrammatic representation of one method of carrying out my invention and is merely illustrative in character. In the drawing, 1 is a pipe leading from a source of hydrocarbon supply and 2 is a pump suitable for delivering liquids or gases under pressure. From pump 2 the material is conducted by pipe 3 to heat exchanger 4. From heat exchanger 4, the material which has entered through pipe 3 is led through pipe 5 to distributing valve 6. Pipe 7 conducts a portion of the material from distributing valve 6 to mixing valve 13.

Pipe 8 leads from a convenient source of oxygen (not shown) while pump 9 is a pump suitable for delivering vapors under pressure. Pipe 10 leads from pump 9 to heat exchanger 11. From the latter, pipe 12 conducts the materials which have entered heat exchanger 11 by pipe 10 to mixing valve 13. The materials which have entered mixing valve 13 from pipes 7 and 12 pass through reaction chamber 14. Reaction chamber 14 is placed in a container 15. The latter also contains a suitable heating medium 16, heated by any convenient means. The materials which have passed through reaction chamber 14 are conducted through pressure relief valve 17 and pipe 18 to coil 19, which passes through heat exchanger 11. From coil 19 the treated materials are conducted through pipe 20 to reaction chamber 21. Pipe 22 serves to conduct a portion of the hydrocarbon material from distributing valve 6 to mixing valve 23. Pipe 24 leads from a convenient source of nitric acid (not shown) to pump 25. From the latter, pipe 26 leads the material to mixing valve 23. From mixing valve 23, the materials are led through reaction chamber 27, which is immersed in heating bath 16 contained in tank 15. Chamber 27 is adjacent to reaction chamber 14, and the materials pass through reaction chamber 27 in a direction opposite to that taken by the materials flowing through reaction chamber 14. From reaction chamber 27, the materials pass through pressure relief valve 28. From the latter, pipe 51 serves to conduct the materials to coil 29, the latter being in heat exchanger 4. From coil 29, the materials are led through pipe 30 into reaction chamber 21. Chamber 31 is a reservoir for a buffer solution, which flows through valve 32 and pipe 33 into reaction chamber 21. From reaction chamber 21, the materials are conducted through valve 34 and pipe 35 to chamber 36. Chamber 37 is a reservoir for acidic wash material. From chamber 37, the wash material is led through valve 38 and pipe 39 into chamber 36. The treated material in chamber 36 may be withdrawn through valve 40 and pipe 40 to still 42. From still 42 a pipe 43 leads to coil 44 immersed in condenser 45. The latter is equipped with an inlet 46, for cooling material, and an outlet 47 for cooling material. From coil 44, a pipe 48 leads to receiver 49. A rotary sliding vane pump 50 is attached to pipe 48, so that the still may be operated under reduced pressure. if desired.

In operation a hydrocarbon material, which may be a pure hydrocarbon material, such as butane, pentane, ethane or propane, or a mixture of hydrocarbon materials such as natural or casinghead gas or any hydrocarbon material, is led through pipe 1 to pump 2. Pump 2 serves to deliver a predetermined amount of hydrocarbon material at a definite predetermined pressure through pipe 3 to heat exchanger 4. At this point the entering hydrocarbon material is preheated by the reaction products in coil 29 which flows through heat exchanger 4. The heated hydrocarbon material then passes through pipe 5 to distributing valve 6, and at valve 6, the hydrocarbon material is proportionately delivered, at a predetermined rate, to pipes 7 and 22. The quantities of hydrocarbon material which are delivered to pipes 7 and 22, will depend upon what final product is desired. For example, if it is desired to secure as end product, a compound or series of compounds which contain one nitro group and two hydroxyl groups per molecule, then distributing valve 6 is regulated so that out of every 3 volumes of hydrocarbon material entering valve 6, two volumes leave through pipe 7 and 1 volume through pipe 22. On the other hand, if it is desired to secure as end product a compound or series of compounds containing one nitro group and one hydroxyl group per molecule, then distributing valve 6 is fixed so that the hydrocarbon material which enters distributing valve 6 is divided equally. In this manner, out of every two volumes of hydrocarbon material that enter distributing valve 6 through pipe 5, one volume leaves through pipe 7 and one volume through pipe 22.

The heated hydrocarbon material which is conducted from distributing valve 6 through pipe 7 is led to mixing valve 13, where it is admixed with a predetermined quantity of oxygen-containing gas. The latter is led from a convenient source of oxygen, such as air or compressed oxygen, to pump 9. Pump 9 serves to deliver a predetermined amount of oxygen-containing gas, at a definite pressure through pipe 10 to heat exchanger 11, where the oxygen-containing gas is preheated by the reaction products which flow from pipe 18 through coil 19 in heat exchanger 11. The preheated oxygen-containing gas passes from heat exchanger 11 through pipe 12 to mixing valve 13, where the oxygen-containing gas is mixed with the hydrocarbon material which has entered mixing valve 13 from pipe 7 and distributor valve 6. The relative proportions of hydrocarbon and oxygen-containing gas which are admixed may be varied by setting of mixing valve 13. The proportions of oxygen-containing gas and hydrocarbon material which are mixed in mixing valve 13 may be varied widely, that is, from 1 to 100 parts or more of oxygen-containing gas to 1 part of hydrocarbon material. Ordinarily, however, a good ratio of oxygen-containing gas to hydrocarbon material is about 10 or 20:1.

The hydrocarbon material-oxygen containing gas mixture then is forced, preferably under superatmospheric pressure which may be of the order of 150 to 1500 pounds per square inch or more, though ordinarily a pressure of 300 to 400 pounds per square inch is sufficient to furnish the desired results, through reaction chamber 14. The latter is immersed in a suitable heat transfer medium 16, placed in container 15. The heat-transfer medium is heated to about 400–420° C. The time of the reaction of the hydrocarbon material and the oxygen-containing gas in reaction chamber 14 should be relatively short, of the order of 0.1 to 5 seconds or more, though I have found that a contact time of 0.5 to 2 seconds is satisfactory to favor aldehyde formation.

At the end of the contact period mentioned above, the reaction products are led through pressure relief valve 17, whereby the pressure of the mixture is reduced substantially to atmospheric. In this way further reaction is inhibited, since the decrease in pressure of the reaction products brings about a corresponding decrease in the temperature of the mixture. The reaction products then are led through pipe 18 to coil 19, which is contained in heat exchanger 11. In this way the reaction products are further cooled by heat interchange with incoming oxygen-containing gas. The cooled reaction products then are led through pipe 20 to reaction chamber 21.

That portion of the preheated hydrocarbon material which is conducted from distributing valve 6 through pipe 22, is led to mixing valve 23. In mixing valve 26 the preheated hydrocarbon material is admixed with nitric acid or other nitrating agent. The nitric acid is conducted from a convenient source (not shown) through pipe 24 to pump 25. Pump 25 serves to deliver the nitric acid or other nitrating agent under suitable pressure to pipe 26, from which the nitric acid or nitrating agent is led to mixing valve 23.

The relative proportions of nitric acid or nitrating agent and preheated hydrocarbon material which are mixed in mixing valve 26 may be varied within wide limits, depending upon the starting materials and extent of nitration desired. When using nitric acid as nitrating agent, ordinarily a ratio of hydrocarbon to nitrating agent of between 4 and 14 or more to 1 is suitable, through I have found that a ratio of about 9 or 10 to 1 is quite satisfactory.

The mixture of preheated hydrocarbon material and nitric acid or other nitrating agent then is conducted through reaction chamber 27, which is placed in tank 15. The time of contact of the mixture in the reaction zone is about 0.1 to 2 seconds, through I have found that a contact time of less than 1 second is suitable to secure substantially complete mononitration of the hydrocarbon material present.

From reaction chamber 27, the reaction products are conducted through pressure relief valve 28, whereby the pressure of the reaction mixture is reduced substantially to atmospheric. In this manner, further reaction is inhibited. The reaction products then are led through pipe 51 to coil 29, which is contained in heat exchanger 4. The reaction products are further cooled at this point by heat-interchange with incoming hydrocarbon material. From coil 29, the reaction products are led through pipe 30 to reaction chamber 21.

Reaction chamber 21 contains a buffer solution which is adjusted to maintain an alkaline condition in reaction chamber 21. The buffer solution is stored in a reservoir 31, from which it may be introduced into reaction chamber 21 by means of valve 32 and pipe 33.

The buffer solution serves to neutralize any acidic materials which enter reaction chamber 21 as reaction products from pipe 20 and pipe 30. In this way any acids which are present in the reaction products of the oxidation step, such as fatty acids, hydroxyacids or oxyacids, for example, are neutralized. Also, any acidic materials from the nitration step such as nitric acid or oxidation products, for example, are neutralized. The alkalinity of the buffer solution should be sufficient to maintain the mixture in reaction chamber 21 at a pH of 7.5–9.0, though I have found that a pH of 8.0–8.5 is quite satisfactory. In other words, any buffer solution may be used which will maintain an alkaline condition in reaction chamber 21.

Instead of using a buffer solution to maintain an alkaline condition in reaction chamber 21, I have found that alkali solutions may be used equally well. For example the material in reservoir 31 may be an aqueous solution of an alkali such as sodium carbonate, potassium carbonate, calcium hydroxide, sodium hydroxide, potassium hydroxide or the like. When alkali is used instead of a buffer, sufficient aqueous alkali solution such as those mentioned above is introduced from reservoir 31 to reaction chamber 21 by means of valve 32 and pipe 33 to bring the mixture in reaction chamber 21 to an alkaline condition.

Under the conditions described above, the aldehydic material secured by treatment of hydrocarbon material with an oxygen-containing gas according to my invention will interact with the nitrohydrocarbons obtained by treatment of the hydrocarbon material with nitric acid or other nitrating agent to furnish nitrohydroxyhydrocarbons. This reaction, which occurs in reaction chamber 21, may be conducted simply by mixing the materials in this chamber.

After a suitable period of agitation, which may vary from 30 minutes to 5 hours or more, depending upon the type of aldehydic and nitrated material present, the aqueous phase is withdrawn from reaction chamber 21 through valve 34 and pipe 35 to tank 36. In tank 36, the aqueous mixture from reaction chamber 21 is neutralized by addition of sufficient acid, which is contained in reservoir 37. From reservoir 37, the neutralizing acid is conducted to tank 36 by means of valve 38 and pipe 39.

When the mixture in tank 36 has been neutralized, it is withdrawn through valve 40 and conducted through pipe 41 to still 42. The material in still 42 then is distilled under atmospheric or subatmospheric pressure, as desired, to separate the nitrohydroxyhydrocarbons secured according to my invention. In the cases where the nitrohydroxyhydrocarbons are liquid at room temperature they may be distilled through pipe 43 to coil 44 which is immersed in cooling tank 45. This tank contains an inlet 46 for cooling liquid and an outlet 47 for cooling liquid. The cooled material in coil 44 then is led through pipe 48 to storage chamber 49. In cases where it is desired to distill under reduced pressure, rotary sliding vane pump 50, which is attached to pipe 48, may be used to reduce the pressure under which distillation occurs.

In some instances, where the nitrohydroxyhydrocarbons secured according to my invention are solids at room temperature, it may be desirable to secure these products as residues of distillation. Any convenient means may be employed to remove such still residues and to separate the nitrohydroxyhydrocarbons. For example, extraction, fractional precipitation or fractional crystallization may be employed.

It will be seen from the foregoing, which is illustrative in character, that my invention comprises a method of securing joint aldehydation and nitration of hydrocarbon material. Further, my invention comprises a method of preparing nitrohydroxyhydrocarbons by securing joint aldehydation and nitration of a hydrocarbon material, and combining the products of the joint nitration and aldehydation step under alkaline conditions.

As was mentioned before, one of the outstanding features of my invention lies in the fact that the aldehydation and nitration reactions are interdependent. As is well known, treatment of hydrocarbon material with an oxygen-containing gas is an exothermic reaction. That is, once the reaction of an oxygen-containing gas and a hydrocarbon material has been nitrated, the reaction gives off heat. For this reason, reactions of this sort have been difficult to control, and various methods of quenching the reaction to prevent an undesirable degree of oxidation have been proposed. I have found that when a mixture of hydrocarbon material and nitric acid or other nitrating agent is used as a controlling agent for the interaction of hydrocarbon material and an oxygen-containing gas, that not only can the latter reaction, i. e., aldehydation, be controlled, but also that nitration of the hydrocarbon material can be effected simultaneously. In other words, nitration of one portion of the hydrocarbon material serves to control aldehydation of another portion of the hydrocarbon material. In this manner there is secured a mixture of nitrohydrocarbons and aldehydes which further interact, according to my invention, to furnish nitrohydroxyhydrocarbons.

Hydrocarbon materials suitable for use in my invention include pure hydrocarbons such as ethane, propane, butane, pentane or hexane as well as mixtures of hydrocarbons such as natural gas or casinghead gas, light gasoline fractions or the like. In other words, any hydrocarbon material which contains a substantial proportion of saturated or paraffinic hydrocarbons may be used in my invention.

By oxygen-containing gas I mean any gas or mixture of gases which contain oxygen in a free or uncombined state. For example, pure oxygen, air, oxygen diluted with an inert substance such as nitrogen, carbon dioxide, steam or the like, or air diluted with an inert substance may be used in my invention.

While in the foregoing description of one method of carrying out my invention the joint aldehydation-nitration reaction was effected under superatmospheric pressure, it is to be understood that my invention can be effected, if desired, under atmospheric or subatmospheric pressure. The feature of my invention is, as was mentioned previously, the joint interdependence of the aldehydation and nitration steps. In other words, these two steps, aldehydation and nitration, serve to mutually control each other.

What I claim is:

1. The process of producing nitrohydroxy-hydrocarbons, which comprises subjecting a gaseous paraffin to a controlled oxidation under conditions favoring the formation of aldehydes and simultaneously nitrating a gaseous paraffin to form nitrohydrocarbons, jointly controlling the temperatures of the oxidation and nitration reactions by heat exchange between materials undergoing said reactions, combining aldehyde and nitro-hydrocarbon products of said reactions and interacting said products in the presence of an alkali.

2. The process according to claim 1, in which the gaseous paraffin subjected to said reactions is in a mixture of paraffinic hydrocarbons having 2 to 5 carbon atoms per molecule.

CARLETON ELLIS.